United States Patent [19]

Saxinger

[11] 4,076,149

[45] Feb. 28, 1978

[54] SLAVE DRIVE FOR TONER DISPENSER WITH STRIKER

[75] Inventor: Allan L. Saxinger, Denton, Tex.

[73] Assignee: Xerox Corporation, Stamford, Conn.

[21] Appl. No.: 658,980

[22] Filed: Feb. 18, 1976

[51] Int. Cl.[2] .......................... B65G 3/12; B65G 65/70

[52] U.S. Cl. .............................. 222/202; 222/DIG. 1

[58] Field of Search ................. 222/DIG. 1, 196, 202, 222/203, 233; 74/84, 436

[56] References Cited

U.S. PATENT DOCUMENTS

| | | | |
|---|---|---|---|
| 1,090,120 | 3/1914 | Scott | 222/202 |
| 1,406,876 | 2/1922 | Larsson | 74/436 |
| 3,847,306 | 11/1974 | Howell et al. | 222/DIG. 1 |
| 3,872,837 | 3/1975 | Rogers | 222/DIG. 1 |
| 3,946,910 | 3/1976 | Case | 222/DIG. 1 |
| 3,954,331 | 5/1976 | Smith | 222/DIG. 1 |
| 3,974,944 | 8/1976 | Takeuchi | 222/DIG. 1 |

*Primary Examiner*—Stanley H. Tollberg
*Assistant Examiner*—Francis J. Bartuska

[57] ABSTRACT

A transmission couples the main drive of an electrostatographic development system to a toner dispensing roll and a spring-loaded striker of a toner dispenser for the development system. The transmission typically includes a Geneva wheel for periodically actuating a lever arm which is coupled by a one-way clutch to a drive shaft for the toner dispenser. That drive shaft suitably is, in turn, mated with a slot at the outer end of the dispensing roll by an enlarged flat or key which functions to alternately cock and release the striker as the dispensing roll is being rotated.

14 Claims, 5 Drawing Figures

SLAVE DRIVE FOR TONER DISPENSER WITH STRIKER

BACKGROUND OF THE INVENTION

This invention relates to development systems for electrostatographic processors and, more particularly, to toner dispensers for development systems which utilize a multi-component developer.

In a conventional electrostatographic printing process, such as classical xerography, a more or less uniformly charged imaging surface is selectively discharged in an imagewise configuration to form a latent electrostatic image of the pattern to be printed. That pattern is then developed by applying an electroscopic marking material (commonly called "toner") to the imaging surface, and the developed image is thereafter fixed on the imaging surface (in a non-transfer mode of operation) or transferred to and fixed on a suitable copy substrate, such as plain paper (in a transfer mode of operation).

Typically, the toner is delivered to the imaging surface as a part of a dry multi-component developer comprising larger "carrier" particles in combination with finely-divided toner particles. The carrier and toner components are formed from materials which are displaced from one another in the triboelectric series so that they tend to acquire electrical charges of opposite polarity as they are blended and mixed together. Moreover, those materials are selected so that the charge imparted to the toner particles opposes the polarity of the latent image carried by the imaging surface.

To carry out the development process, the latent image-bearing imaging surface is customarily advanced through a development zone, while developer is being circulated along a path running from a sump, through the development zone and then back to the sump. Toner is electrostatically stripped from the developer which comes into actual contact with or into the immediate proximity of the imaging surface, thereby developing the image and reducing the toner concentration of the remaining or residual developer. For that reason, there ordinarily is a toner dispenser for adding fresh toner to the developer from time to time.

Substantial effort and expense have been devoted to the development of toner dispensers. One of the more efficient models proposed to date is disclosed and claimed in Hudson et al U.S. Pat. Re. No. 27,876, which issued Jan. 8, 1974, for "Dispensing Apparatus". Indeed, the toner dispenser of that patent is generally representative of the background of this invention and, therefore, the Hudson patent is hereby incorporated by reference.

SUMMARY OF THE INVENTION

An object of this invention is to provide a reliable and economical toner dispenser which is especially well suited for use in the development systems of electrostatographic processors which are sporadically operated at relatively low copy volume levels.

Another object of the present invention is to provide an improved transmission for utilizing the main drive mechanism of a development system to power a toner dispenser having a rotatably mounted roll for dispensing toner from a hopper-like reservoir and a spring-loaded impact device for preventing toner from bridging between the sidewalls of the reservoir.

To carry out these and other objects of this invention, a toner dispenser of the foregoing type has its dispensing roll coupled to the main drive mechanism of the associated development system by a transmission which includes a cam for alternately cocking and releasing the impact device, whereby the dispensing roll is driven and the impact device is operated in a slave mode by the development system.

BRIEF DESCRIPTION OF THE DRAWINGS

Still further objects and advantages of the present invention will become apparent when the following detailed description is read in conjunction with the attached drawings, in which.

DETAILED DESCRIPTION OF THE ILLUSTRATED EMBODIMENT

While the invention is described in some detail hereinafter with specific reference to a single illustrated embodiment, it is to be understood that there is no intent to limit it to that embodiment. On the contrary, the aim is to cover all modifications, alternatives, and equivalents falling within the spirit and scope of the invention as defined by the appended claims.

Figure 1:
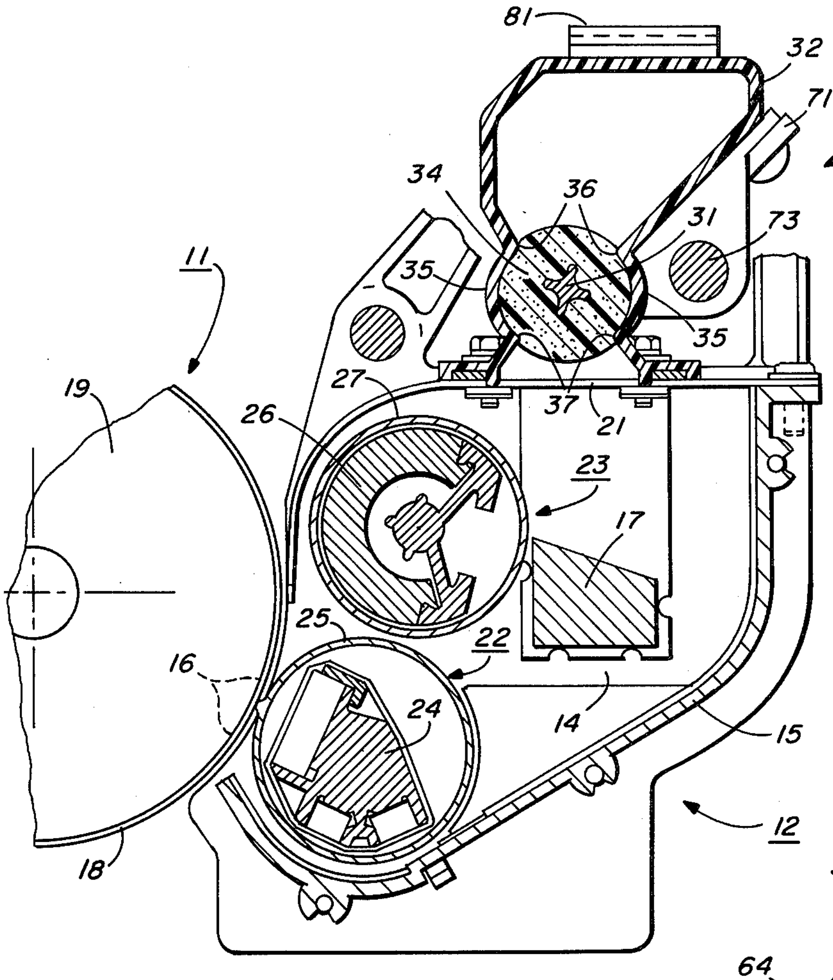
FIG. 1 is a simplified sectional view, partly in fragmentary form, of an electrostatographic processor having a development system equipped with a toner dispenser constructed in accordance with the present invention.

Turning now to the drawings, and especially to FIG. 1, there is an electrostatographic processor 11 (shown only in relevant part) having a development system 12 which is equipped with a toner dispenser 13. The development system 12 operates to circulate a multi-component developer comprising triboelectrically charged toner and carrier particles along a path running from a sump 14 in the lower reaches of a housing 15, through a development zone 16, and then back toward the sump 14 via a crossmixer 17, thereby developing latent electrostatic images carried by an imaging surface 18 on the fly — viz., as the imaging surface 18 advances through the development zone 16. For illustrative purposes, it has been assumed that the imaging surface 18 is a photoconductive coating on a rotatably driven, electrically conductive drum 19.

Some toner is necessarily electrostatically stripped from the developer during the development proces. Thus, in keeping with generally accepted practices, the toner dispenser 13 is mounted on the development system housing 15 over an elongated slot 21 to feed fresh toner into the sump 14 from time to time so that the toner concentration of the developer is maintained at a suitably high level. Preferably, the toner dispenser 13 is more or less vertically aligned with the crossmixer 17 so that the fresh toner is at least partially blended and mixed with the circulating developer while en route to the sump 14.

More particularly, as shown, the development system 12 is a so-called magnetic brush unit having an applicator roll 22 and a lifting roll 23. That, of course, means that a compatible developer containing, say, ferromagnetic carrier particles is called for. Briefly, the applicator roll 22 comprises a permanent magnet assembly 24 which is stationarily supported within a rotatably driven, non-magnetic sleeve 25, whereby developer flowing from the sump 14 is magnetically entrained on the sleeve 25 and transported upwardly through the development zone 16 under the influence of the field generated by the magnetic assembly 24. In the ordinary course, that field is shaped so that the developer magnetically entrained on the sleeve 25 tends to collect into bristle-like stacks in the area of the development zone 16 to brush against the imaging surface 18. The lifting roll 23 is similarly configured with a permanent assembly 26 which is stationarily supported within another rotatably driven, nonmagnetic sleeve 27, but its function is to transport the residual developer (i.e., the developer exiting the development zone 16) upwardly away from the applicator roll 22 to a remote discharge point leading toward the crossmixer 17.

The toner dispenser 13, on the other hand, includes a rotatably driven roll 31 for metering toner from an elongated hopper-like reservoir 32 and a spring-loaded impact device 33 for preventing toner from bridging between the opposed sidewalls of the reservoir 32. The dispensing roll 31 is journaled for rotation in the opposite end walls of the reservoir 32 and is coated with a cellular, foam-like material 34, such as urethane foam. Indeed, in accordance with the teachings of the aforementioned Hudson patent, the dispensing roll 31 is seated within an arcuate collar 35 which runs along the bottom of the reservoir 32 and which is sized to slightly compress the foam-like coating 34 of the dispensing roll 31 at upper and lower pressure points 36 and 37, respectively. As will be appreciated, the compressive action of the upper pressure points 36 causes the dispensing roll 31 to effectively seal the reservoir 32 against unwanted leakage of toner, while the compressive action of the lower pressure points 37 assists in dislodging toner from the dispensing roll 31.

Figure 2:
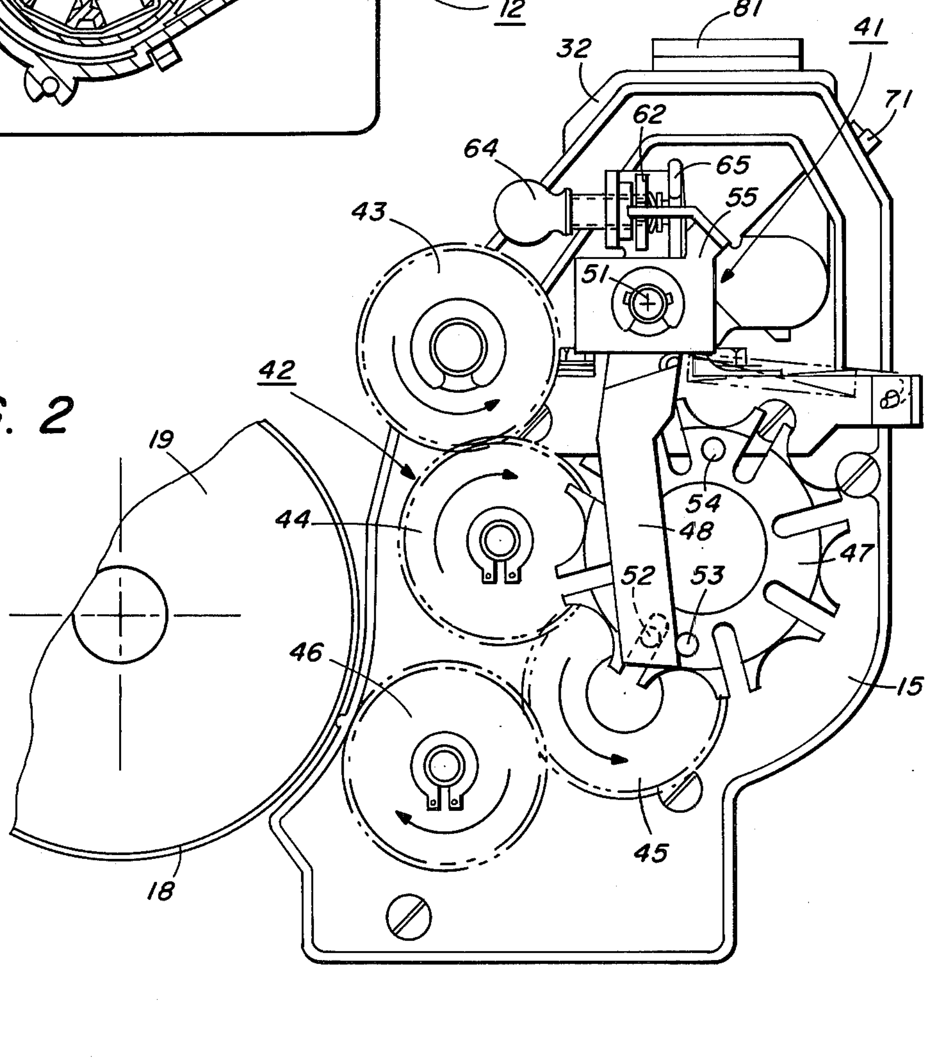
FIG. 2 is an elevational view of the transmission provided in accordance with the present invention for coupling the toner dispenser to the main drive mechanism of the development system.

Referring to FIG. 2, in accordance with the present invention, an economical but very effective transmission roll 41 is provided to derive the power for driving the dispensing roll 31 and the spring-loaded impact device 33 from the main drive mechanism 42 for the development system 12. As illustrated, the main drive 42 comprises a series train of meshed gears, including a driven gear 43, a spur gear 44, a Geneva drive gear 45, and another spur gear 46. A suitable motor (not shown) is coupled through a clutch (also not shown) to drive the driven gear 43. The resultant rotation of the driven gear 43 causes the spur gears 44 and 46 to rotate, thereby driving the lifting roll sleeve 27 and the applicator roll sleeve 25, respectively. Moreover, the rotation of the driven gear 43 also causes the Geneva drive gear 45 to rotate, thereby indexing a Geneva wheel 47.

The Geneva wheel 47 is included within the transmission 41 to operate a lever arm or crank 48 which, in turn, is coupled by a one-way clutch (not shown) to a drive shaft 51 for the toner dispenser 13. In this embodiment, a single drive pin 52 projects axially outwardly from the face of the Geneva drive gear 45 to index the Geneva wheel 47, and a pair of diametrically opposed drive pins 53 and 54 project axially outwardly from the face of the Geneva wheel 47 to alternately engage the free end of the crank 48. Hence, the crank 48 is periodically actuated at a suitably reduced rate while the development system 12 is in operation. For example, as shown, the Geneva wheel 47 is configured to achieve a speed reduction of 4:1.

Figure 3:
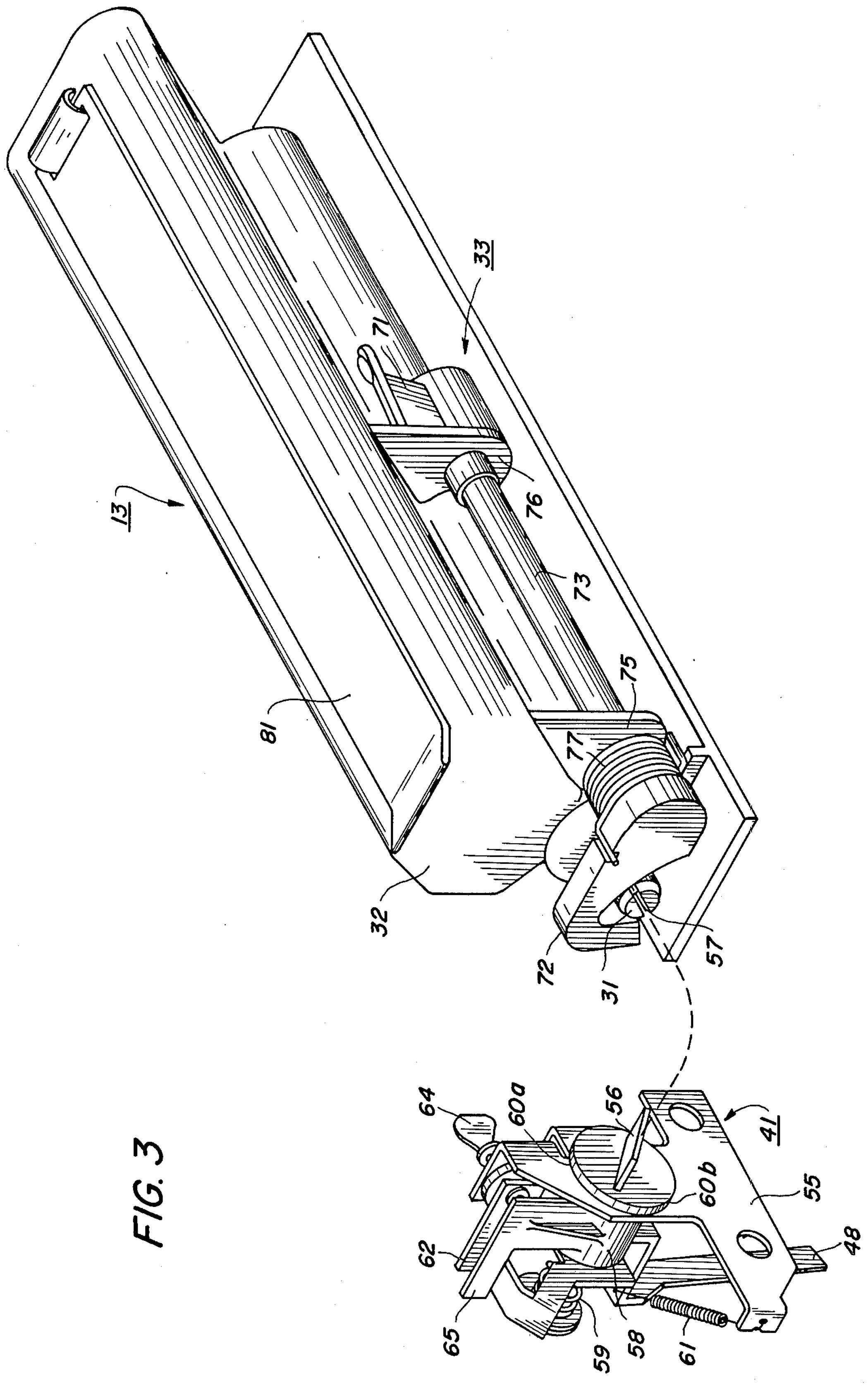
FIG. 3 is an exploded perspective view showing the toner dispenser and a portion of the transmission in additional detail.

Concentrating on FIGS. 2 and 3, it will be seen that the drive shaft 51 is journaled for rotation in a bracket 55 and has its inner end terminated by an enlarged flat or key 56 which mates with a slot 57 in the outer end of the toner dispensing roll 31. The crank 48 is secured to and depends from a sleeve 58 which is coupled by the aforementioned one-way clutch to the drive shaft 51. That clutch is hidden from view, but it will be evident that it suitably is a Torrington-type clutch or the like, whereby the sleeve 58 transmits torque to or freewheels on the drive shaft 51 depending on whether the sleeve 58 (as viewed in FIG. 3) is rotating in, say, a counterclockwise direction or a clockwise direction, respectively. Indeed, there is an anti-backlash spring 59 which is held in compression between the outer end of the drive shaft 51 and the bracket 55 to draw a friction surface **60*a* carried by the shaft 51 against a corresponding friction surface 60*b* on the bracket 55, thereby resisting any forbidden or clockwise rotation of the drive shaft 51**.

A tension spring 61 is connected between the crank 48 and the bracket 55 to bias the free end of the crank 48 towards the axis of rotation of the Geneva wheel 47. Accordingly, as the Geneva wheel 47 is indexed, the drive pins 53 and 54 are alternatively brought into engagement with the free end of the crank 48, thereby swinging it away from the axis of rotation of the Geneva wheel 47 to rotate the sleeve 58 and, therefore, the drive shaft 51 in a counterclockwise direction. That, of course, causes the toner dispensing roll 31 to index, thereby feeding a metered amount of toner from the reservoir 32.

To control the toner dispensing rate, the travel of the crank 48 is limited by a stop 62, which preferably is adjustable so that the toner dispensing rate may be varied by the operator in the interest of optimizing the performance of the development system 12 under different operating conditions. Hence, the stop 62 is carried by a thumb screw 64 which is threaded through the bracket 55. Moreover, there is an ear 65 secured to and extending upwardly from the sleeve 58 in position to abut against the stop 62 as the crank 48 reaches the forward or clockwise limit of its travel.

Figure 4A:
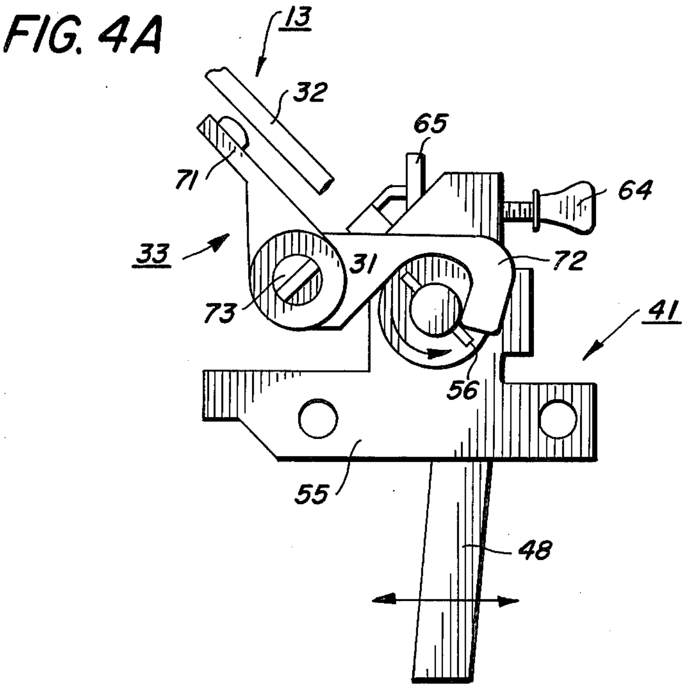
FIGS. 4A and 4B are simplified stop action views illustrating the relationship between the transmission and the spring-loaded impact device of the toner dispenser in some additional detail.
Figure 4B:
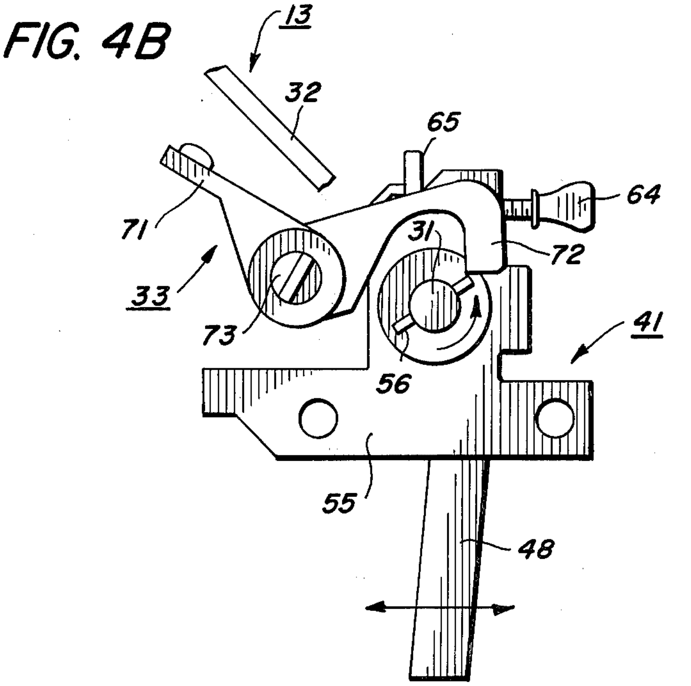

In keeping with the present invention, the impact device 33 comprises a striker 71 and a cam follower 72 which are secured to the opposite ends of a shaft 73. The shaft 73 is journaled for rotation in spaced-apart brackets 75 and 76 on an outer sidewall of the toner reservoir 32 and functions to maintain the striker 71 adjacent the outer sidewall of the reservoir 32 and the cam folllower 72 adjacent the outer end of the toner dispensing roll 31. Suitably, a torsion spring 77 is connected between the shaft 73 and the toner reservoir 32 to supply a bias for urging the striker 71 toward the outer sidewall of the reservoir 32. Furthermore, the cam follower 72 advantageously has a hook-like contour, whereby the enlarged flat 56 on the drive shaft 51 additionally serves to alternately cock (FIG. 4B) and release (FIG. 4A) the impact device 33 while the toner dispensing roll 31 is being rotated. As will be appreciated, when the impact device 33 is released, the bias spring 77 causes the striker 71 to impact against the outer sidewall of the toner reservoir 32, thereby applying a shock force for dislodging any toner which might otherwise tend to bridge between the interior sidewalls of the reservoir 32.

Here, the toner reservoir 32 has a hinged lid 81 so that the toner supply may be replenished in situ. The assumption is that the electrostatographic processor 11 is a low volume unit, such as a facsimile printer, since it otherwise would be preferable to use a replaceable, cartridge-like unit, such as suggested in the above-identified Hudson patent.

CONCLUSION

In view of the foregoing, it will now be understood that the present invention provides a relatively simple but highly effective transmission for using the main drive mechanism of a development system to drive a toner dispenser. A toner dispenser equipped with such a transmission is especially well suited for use in electrostatographic processors which are operated at relatively low copy volume levels, but certain aspects of the invention are equally applicable to replaceable, cartridge-like toner dispensers such as are more commonly used in processors operated at higher copy volume levels.

What is claimed is:

1. In an electrostatographic processor having an imaging surface for carrying latent electrostatic images;

a development system for developing said images; said development system including drive means, and transport means powered by said drive means for circulating a multicomponent developer along a path running from a sump, through a development zone, and then back to said sump; and a toner dispenser for adding toner to said developer from time to time; said toner dispenser comprising a reservoir for storing a supply of toner, a rotatably mounted dispensing roll positioned between said reservoir and said path for feeding toner out of said reservoir and toward said path, a striker mounted for movement toward and away from said reservoir, and means for biasing said striker into engagement with said reservoir;

the improvement comprising a transmission for deriving power from said drive means to drive said dispensing roll and said striker, said transmission including a drive shaft coupled to said dispensing roll, a lever arm coupled to said drive shaft for rotating said dispensing roll in a first direction, means for biasing said lever arm in a second, opposite direction, a stop positioned for limiting the travel of said lever arm in said second direction, a wheel-like member coupled to be rotatably driven by said drive means, at least one drive pin projecting outwardly from said wheel-like member in position to urge said lever arm in said first direction, whereby said dispensing roll is rotated to feed toner from said reservoir at a controlled rate, and a cam and an engaged cam follower coupled between said drive shaft and said striker for alternately cocking and releasing said striker as said dispensing roll is being rotated, whereby said striker applies shock forces to said reservoir to maintain a free flow of toner;

said drive shaft having an enlarged flat at one end, and said dispensing roll having a slot at its outer end for receiving said flat, whereby said drive shaft is coupled to said dispensing roll;

said cam being defined by said flat; and said cam follower being coupled to said striker and being positioned adjacent the outer end of said dispensing roll to engage said flat.

2. The improvement of claim 1 further including an anti-backlash spring coupled to said drive shaft for engaging friction surfaces to resist rotation of said dispensing roll in said second direction.

3. The improvement of claim 1 further including means for adjusting the position of said stop, whereby the rate at which toner is fed from said reservoir is adjusted.

4. The improvement of claim 1 wherein said wheel-like member is a Geneva wheel and is coupled to said drive means by means including a Geneva drive gear, whereby said Geneva wheel is rotatably indexed while said development system is in operation to periodically bring said drive pin into engagement with said lever arm.

5. The improvement of claim 1 further including means for manually adjusting the position of said stop, thereby permitting the rate at which toner is fed from said reservoir to be manually adjusted.

6. The improvement of claim 1 wherein said toner reservoir has a hopper-like configuration with a bottom opening leading to said dispensing roll, and said dispensing roll is journaled for rotation in opposed end walls of said reservoir and is seated within said opening to seal said reservoir against unwanted leakage of toner.

7. The improvement of claim 1 wherein said cam follower has a hook-like configuration and is coupled to said striker by a rotatable shaft, and said means for biasing said striker includes a spring connected between said shaft and said reservoir.

8. A transmission for driving a toner dispenser having a reservoir for storing a supply of toner, a rotatably mounted dispensing roll for feeding metered amounts of toner out of said reservoir, and a biased impact device for importing shock forces to said reservoir to maintain a free flow of toner; said transmission comprising the combination of a drive shaft having an enlarged flat at one end for connection to said dispensing roll, a crank having one end coupled to said drive shaft for rotating said dispensing roll in a first direction and an opposite free end extending outwardly away from said drive shaft, an indexable wheel-like member having at least one drive pin extending therefrom in position to engage the free end of said crank, means for incrementally indexing said wheel-like member, thereby causing said drive pin to periodically urge said crank in said first direction, bias means for urging said crank in a second, opposite direction, and cam follower means coupled to said impact device in position to engage said flat for alternately cocking and releasing said impact device in response to rotation of said dispensing roll.

9. The transmission of claim 8 wherein said crank transmits torque to said drive shaft when urged in said first direction and freewheels on said drive shaft when urged in said second direction, and further including anti-backlash means coupled to said drive shaft to engage friction surfaces for resisting rotation of said drive shaft in said second direction.

10. The transmission of claim 9 wherein said drive shaft is journaled for rotation in a bracket, and said antibacklash means includes a compression spring connected between said bracket and said drive shaft.

11. The transmission of claim 8 further including a stop for limiting the travel of said crank in said second direction, thereby controlling the rate at which toner is fed from said reservoir.

12. The transmission of claim 8 further including means for moving said stop through a predetermined range of positions, whereby the rate at which toner is fed from said reservoir may be adjusted.

13. The transmission of claim 8 wherein said camming means includes a cam follower positioned adjacent one end of said dispensing roll, said drive shaft is coupled to said one end of said dispensing roll by means including a cam for actuating said cam follower to alternately cock and release said impact device.

14. The transmission of claim 8 wherein said cam follower has a hook-like contour; and said impact device comprises a striker positioned adjacent an outer sidewall of said reservoir, a rotatable shaft having one end secured to said cam follower and an opposite end secured to said striker, and a spring connected between said reservoir and said rotatable shaft for biasing said striker toward said sidewall.

* * * * *